United States Patent
Di

(10) Patent No.: US 10,437,599 B2
(45) Date of Patent: Oct. 8, 2019

(54) SYSTEM AND METHOD OF REDUCING PROCESSOR PIPELINE STALL CAUSED BY FULL LOAD QUEUE

(71) Applicant: Shanghai Zhaoxin Semiconductor Co., Ltd., Shanghai (CN)

(72) Inventor: Qianli Di, Beijing (CN)

(73) Assignee: SHANGHAI ZHAOXIN SEMICONDUCTOR CO., LTD., Shanghai (CN)

(*) Notice: Subject to any disclaimer, the term of this patent is extended or adjusted under 35 U.S.C. 154(b) by 185 days.

(21) Appl. No.: 15/810,835

(22) Filed: Nov. 13, 2017

(65) Prior Publication Data

US 2018/0307492 A1 Oct. 25, 2018

(30) Foreign Application Priority Data

Apr. 25, 2017 (CN) .......................... 2017 1 0278116

(51) Int. Cl.
*G06F 9/38* (2018.01)
*G06F 9/30* (2018.01)
*G06F 12/0875* (2016.01)

(52) U.S. Cl.
CPC ........ *G06F 9/3836* (2013.01); *G06F 9/30043* (2013.01); *G06F 12/0875* (2013.01); *G06F 2212/452* (2013.01)

(58) Field of Classification Search
CPC ................ G06F 9/3836; G06F 9/30043
See application file for complete search history.

(56) References Cited

U.S. PATENT DOCUMENTS

2006/0230408 A1* 10/2006 Frigo .................. G06F 9/30043
718/108
2012/0221835 A1* 8/2012 Tran ...................... G06F 9/3017
712/208

(Continued)

FOREIGN PATENT DOCUMENTS

CN 106557301 A 4/2017

OTHER PUBLICATIONS

Sethumadhavan et al, Late-Binding: Enabling unordered load-store queues, 2007, International Symposium on Computer Architecture, 11 pages, [retreived from the internet on Jul. 11, 2019], retrieved from URL <www1.cs.columbia.edu/~simha/cal/pubs/pdfs/isca058-sethumadhavan.pdf> (Year: 2007).*

*Primary Examiner* — Jyoti Mehta
(74) *Attorney, Agent, or Firm* — McClure, Qualey & Rodack, LLP

(57) ABSTRACT

A processor that reduces pipeline stall including a front end, a load queue, a scheduler, and a load buffer. The front end issues instructions while a first full indication is not provided, but otherwise stalls issuing instructions. The load queue stores issued load instruction entries including information needed to execute the issued load instruction. The load queue provides a second full indication when full. The scheduler dispatches issued instructions for execution except for stalled load instructions, such as when not yet been stored in the load queue. The load buffer transfers issued load instructions to the load queue when the load queue is not full. When the load queue is full, the load buffer temporarily buffers issued load instructions until the load queue is no longer full. The load buffer allows more accurate load queue full determination, and allows processing to continue even when the load queue is full.

18 Claims, 2 Drawing Sheets

(56) References Cited

U.S. PATENT DOCUMENTS

2017/0090934 A1 3/2017 Di et al.
2018/0032343 A1* 2/2018 Chen .................... G06F 9/3814

* cited by examiner

SYSTEM AND METHOD OF REDUCING PROCESSOR PIPELINE STALL CAUSED BY FULL LOAD QUEUE

CROSS REFERENCE TO RELATED APPLICATIONS

This application claims the benefit of China Patent Application No. 201710278116.5, filed on Apr. 25, 2017, the entirety of which is incorporated by reference herein.

BACKGROUND OF THE INVENTION

Field of the Invention

The present invention relates in general to the process of executing load instructions to load information from memory in a processor, and more particularly to a system and method of reducing pipeline stalls in the processor caused by fullness of a load execution queue.

Description of the Related Art

A typical computer system includes a processor for executing instructions of an application or software program or the like, and an external system memory coupled to the processor for storing portions of the computer program and applicable data and information. The term "processor" as used herein refers to any type of processing unit, including a microprocessor, a central processing unit (CPU), one or more processing cores, a microcontroller, etc. The term "processor" as used herein also includes any type of processor configuration, such as processing units integrated on a chip or integrated circuit (IC) including those incorporated within a system on a chip (SoC) or the like.

The trend of processor design is to provide a processor that consumes less power and that is smaller, more efficient, and more powerful. There is often a balance or tradeoff between performance, cost, and power consumption. In modern CPU architecture, SoC configurations are proving to be more important and useful in order to achieve a balanced tradeoff. The present disclosure is applicable to any type of processor configuration including those incorporated within a SoC.

A conventional processor design stalls the front end of the processor pipelined architecture based on the fullness of the load execution queue, or simply, the load queue. The load queue holds all of the information of each load instruction that is required for executing the load instruction. One conventional method of determining the fullness of the load queue is to add the total number of load instructions that are currently in the pipeline of the processor, which includes the number of load instructions that have been issued and are currently in the scheduler, the number of load instructions that have been loaded into the load queue, and the number of load instructions that have been dispatched but that have not yet reached the load execution pipeline. This total number of load instructions is then compared with the total capacity of the load queue, meaning the total number of load instruction entries in the load queue. In this manner, the load queue is speculatively calculated to be full even if not actually full, so that the front end pipeline may be stalled prematurely. The load queue becomes a bottleneck that stalls the pipeline when speculatively determined to be full, which also causes other functional units to be idle as well. This has become a very common issue that has been observed in many conventional CPU architectures.

One possible solution is to enlarge the load queue to reduce the probability of a pipeline stall. A larger load queue, however, consumes a significant amount of additional area and power and does not resolve the overall issue.

SUMMARY OF THE INVENTION

A processor that is capable of reducing pipeline stall according to one embodiment includes a front end, a load queue, a scheduler, and a load buffer. The front end issues instructions while a first full indication is not provided, but is otherwise stalled. The load queue stores load instruction entries for storing information needed to execute issued load instructions. The load queue provides a second full indication when it is full. The scheduler stores instructions that have been issued from the front end and dispatches issued instructions to be executed. The scheduler stalls dispatch of issued load instructions that have not yet been stored into the load queue when the load queue is full. The load buffer receives and transfers issued load instructions to the load queue when not full. When full, the load buffer temporarily buffers issued load instructions until the load queue is no longer full.

A stall indication is provided to the scheduler to stall dispatch of issued load instructions that have not yet been stored into the load queue when the load queue is full. The stall indication may identify load instructions that are stored in the load buffer that have not yet been transferred to the load queue. Alternatively, the stall indication may identify load instructions that are stored in the load queue.

The load buffer may have multiple entries in which each entry includes a source identifier and a destination identifier. The load queue may have multiple entries in which each entry includes the source identifier, the destination identifier, a memory address, and memory space for storing data. The load buffer may further store information identifying previously issued store instructions with each buffered load instruction. In one embodiment, a valid list may be provided that includes a valid bit for each entry of a store queue, and the load buffer includes a field for storing a valid vector which includes the valid bits of the valid list when a load instruction is pushed into the load buffer.

The scheduler may continue to dispatch load instructions that are stored in the load queue while the load queue is full (e.g., while the second full indication is provided). The scheduler may continue to dispatch issued instructions other than issued load instructions that are stalled. The load queue may include a memory bank, and the load buffer may include multiple memory banks, each of which is a duplicate of the memory bank of the load queue.

A method capable of reducing processor pipeline stall according to one embodiment includes issuing instructions while a first full indication is not provided, and stalling issuing instructions while the first full indication is provided, storing, by a load queue, issued load instructions and corresponding information needed to execute each load instruction, and providing a second full indication when the load queue is full, dispatching, by a scheduler, those of the issued instructions that are ready to be executed, and stalling dispatching of those issued load instructions that have not yet been stored into the load queue when the load queue is full, receiving and forwarding, by a load buffer, the issued load instructions to the load queue while the second full indication is not provided, and buffering, by the load buffer, the issued load instructions while the second full indication is provided, and providing, by the load buffer, the first full indication when the load buffer is full.

The method may include detecting that the load queue is full and providing the second indication, and receiving the second indication and providing a stall indication to stall those issued load instructions that have not yet been stored into the load queue while the second full indication is provided. The method may include providing the stall indication by marking instructions in the scheduler that are also located in the load buffer. The stalling dispatching may include providing a stall indication to stall those issued load instructions that have not yet been stored into the load queue when the load queue is full.

The method may include identifying older store instructions upon issuing each load instruction, and storing into the load buffer, along with each load instruction, information that identifies the store instructions that are older than the load instruction. The method may include maintaining a valid list of valid bits identifying valid store instructions, and storing a valid vector of valid bits along with each load instruction when stored into the load buffer.

The method may include continuing to dispatch load instructions that are located in the load queue while the second full indication is provided. The method may include continuing to dispatch issued instructions other than issued load instructions that are stalled while the second full indication is provided. The method may include providing a memory bank for the load queue, and providing multiple memory banks for the load buffer in which each memory bank of the load buffer is a duplicate of the memory bank of the load queue.

BRIEF DESCRIPTION OF THE DRAWINGS

The benefits, features, and advantages of the present invention will become better understood with regard to the following description, and accompanying drawings where.

DETAILED DESCRIPTION

The inventor has recognized the reduction in performance and efficiency of a processor when the load execution queue (or load queue) is speculatively determined to be full causing the front end of the processor to be stalled. He has therefore developed a system and method of reducing processor pipeline stall caused by the full determination of the load queue. A load buffer is inserted between the front end and the load queue that buffers issued load instructions for the load queue. The size and operation of the load queue may remain unchanged. The load buffer only contains load information and may be made significantly deeper than the load queue without significantly increasing size and power consumption. While the load queue is not full, issued load instructions pushed into the load buffer are passed to the load queue. When the load queue is actually determined to be full (rather than speculatively determined to be full), issued load instructions may continue to be pushed into the load buffer while not being pushed into the load queue. The load instructions that have been pushed into the load queue may continue to be dispatched from the scheduler, but those in the load buffer not yet pushed into the load queue are temporarily stalled from being dispatched. The front end is not yet stalled and may continue to issue additional instructions including load instructions. Other instruction types and load instructions that have been pushed into the load queue may continue to be processed. The front end is stalled only when the load buffer also becomes full, but at that point the scheduler still holds instructions for out-of-order scheduling so that the processor pipeline remains active and not idle.

Figure 1:
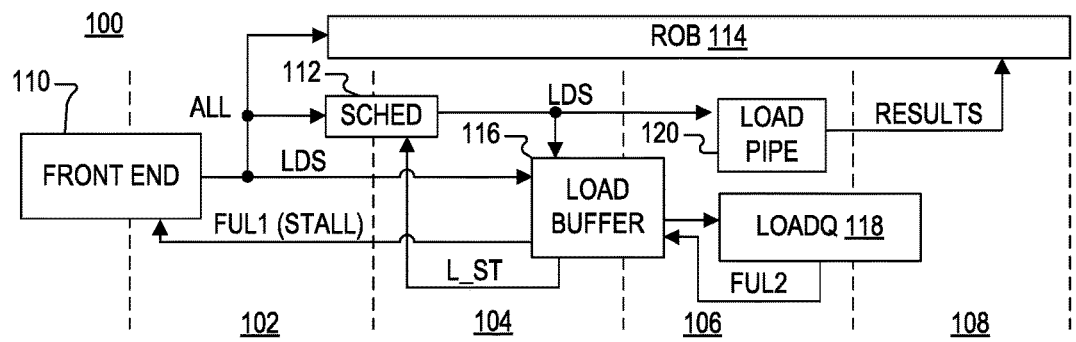
FIG. 1 is a simplified block diagram of a superscalar, pipelined processor that reduces pipeline stall caused by full load queue according to one embodiment of the present invention.

FIG. 1 is a simplified block diagram of a superscalar, pipelined processor 100 that reduces pipeline stall caused by a full load queue according to one embodiment of the present invention. The macroarchitecture of the processor 100 may be an x86 macroarchitecture in which it can correctly execute a majority of the application programs that are designed to be executed on an x86 processor. An application program is correctly executed if its expected results are obtained. In particular, the processor 100 executes instructions of the x86 instruction set and includes the x86 user-visible register set. The present invention is not limited to x86 architectures, however, in which processor 100 may be according to any alternative architecture as known by those of ordinary skill in the art.

In the illustrated embodiment, the processor 100 has a pipelined architecture with multiple stages, including an issue stage 102, a dispatch stage 104, an execute stage 106, and a write back or retire stage 108. The stages are shown separated by dashed lines, each generally depicting a set of synchronous latches or the like for controlling timing based on one or more clock signals. The issue stage 102 includes a front end 110, which generally operates to retrieve cache lines from an application or program located in an external system memory (not shown), decode and translate the retrieved information into instructions, and issue the translated instructions to the dispatch stage 104 in program order. The front end 110 may include, for example, an instruction cache (not shown) that retrieves and stores cache lines incorporating program instructions, an instruction decoder and translator (not shown) that decodes and translates the cache lines from the instruction cache into instructions for execution, and a register alias table (RAT) (not shown) that generates dependency information for each instruction based on its program order, on the operand sources it specifies, and on renaming information.

The front end 110 issues the instructions and their associated dependency information to a scheduler 112 of the dispatch stage 104. The scheduler 112 may have any type of configuration, including a unified configuration. The notation "ALL" in FIG. 1 denotes that all instructions, including load instructions, are issued to the scheduler 112 for ultimate dispatch for execution. The scheduler 112 includes one or more queues that hold the instructions and dependency information received from the front end 110. In conjunction with issuing an instruction, the RAT of the front end 110 also allocates an entry for the instruction in a reorder buffer (ROB) 114. Thus, all of the issued instructions are allocated in program order into the ROB 114, which may be configured as a circular queue to ensure that the instructions are retired in program order. In certain configurations, the allocated entry within the ROB 114 may further include memory space, such as a register or the like, for storing the results of the instruction once executed. Alternatively, the processor 100 includes a separate physical register file (PRF) (not shown), in which the allocated entry may include a pointer to an allocated register within the PRF for storing result information. A load instruction, for example, retrieves data from a level-2 (L2) cache memory or the like (ultimately retrieved from the external system memory), and temporarily stores the data into the allocated register in the PRF.

Issued load instructions (LDS) are also provided in order to a load buffer 116, which are then transferred or passed through to a load queue 118 when the load queue 118 is not full. When the load queue 118 is not full, an issued load instruction is pushed into the load buffer 116 and the same or a different load instruction is popped from the load buffer 116 and loaded into the load queue 118. If the load buffer 116 is empty, then the same issued load instruction pushed into the load buffer 116 is popped from the load buffer 116 and pushed into the load queue 118. The scheduler 112 dispatches instructions to the execute stage 106 when ready to be executed. An instruction is ready to be executed when all of its dependencies are resolved and an execution unit is available to execute the instruction. Functional instructions, such as floating point instructions (e.g., media type instructions or the like) or integer instructions or the like, are dispatched to functional execution units (not shown). Memory instructions, including load and store instructions, are dispatched to a memory order buffer (MOB) (not shown) within the execution stage. The MOB includes one or more load and store pipelines, or combined load/store pipelines.

The illustrated configuration shows a load pipeline (or "load pipe") 120 for executing load instructions, in which the load pipe 120 is part of the MOB. Load instructions are dispatched from the scheduler 112 only after being loaded into the load queue 118. The load queue 118 includes sufficient information for execution of each load instruction stored therein, including the source and destination identifier of the load instruction, an address of the memory location from which data is retrieved and the retrieved data, memory space for storing the retrieved data (the memory space is, for example, as wide as the data path, such as, for example, 128 or 256 bits) and some status bits, which may include, for example, a valid bit, a lock bit, a dispatched bit, a complete bit, a data valid bit, an address valid bit, a store queue index that the load instruction will forward to, a fill queue index that the load instruction will forward to, among other possible status bits.

Each load instruction includes a specified address and a specified data length. The load pipe 120 translates the address of the load instruction into a virtual address (VA), which is ultimately converted to a physical address (PA) for directly accessing the cache memory. The physical address is retrieved from a translation look-aside buffer (TLB) or as a result of a table walk process or the like. The load queue 118 stores the virtual address, which is then replaced by the physical address once determined. The load pipe 120 uses the physical address to access the data from a cache line stored in the memory (L2 cache or system memory), and the result is temporarily stored into the load queue 118 in the memory space of an entry that corresponds with the load instruction. The RESULT is fed back to be stored into the ROB 114 or an allocated PRF and/or forwarding to another execution unit for use by another instruction or the like. The ROB 114 eventually retires the load instruction and updates the architectural state of the processor 100.

In conventional configurations without the load buffer 116, the load instructions were loaded directly into the load queue 118 upon issuance. When the load queue 118 was speculatively determined to be full, the front end 110 was stalled from issuing further instructions, and many of the execution units were temporarily idle causing reduced efficiency and performance.

In the present case as illustrated by the processor 100, however, the load queue 118 provides a full indication FUL2 when it actually becomes full of load instructions. FUL2 is provided to the load buffer 116, which does not push additional load instructions to the load queue 118 when issued. Instead, when FUL2 is provided, load instructions issued from the front end 110 are temporarily buffered in the load buffer 116. Also, in the illustrated embodiment, the load buffer 116 asserts a load stall indication L_ST to the scheduler 112 to stall dispatch of issued load instructions that have not yet been pushed into the load queue 118. In another embodiment, the load queue 118 instead asserts the load stall indication L_ST by when it actually becomes full. The scheduler 112 may continue to dispatch issued load instructions that have already been loaded in the load queue 118.

When the load pipe 120 completes a load instruction, it empties the corresponding entry in the load queue 118. As entries in the load queue 118 are emptied, the load instructions that are buffered in the load buffer 116 may be transferred in order to the load queue 118. As load instructions buffered in the load buffer 116 are transferred to the load queue 118, the load buffer 116 updates L_ST so that only the issued load instructions that are not in the load queue 118 may continue to be stalled from dispatch. If the load buffer 116 becomes empty after transferring buffered load instructions to the load queue 118, then L_ST is no longer provided or otherwise no longer stalls issued load instructions from being dispatched. It is noted that the dispatch of the issued load instructions that have already been loaded in the load queue 118 are not affected by the assertion of L_ST.

The function of L_ST for stalling dispatch of load instructions may be implemented in any one of several ways. L_ST may indicate a first load instruction that has just been buffered in the load buffer 116 but not yet been transferred to the load queue 118 when the load queue 118 is full. The scheduler 112 stalls dispatching of the indicated load instruction and any later issued load instructions. It is noted, however, that although instructions are issued in order to the scheduler 112, they may be dispatched out of order so that the scheduler 112 may not implicitly track load instruction ordering. Alternatively, L_ST may include multiple pointers in which each points to a load instruction in the scheduler 112 that is also located in the load buffer 116. If located in the load buffer 116, then the load instruction has not been loaded into the load queue 118 and dispatch is stalled for that load instruction. On the other hand, each pointer may point to those load instructions that have been loaded into the load queue 118 such that they may be dispatched. Alternatively, L_ST is used to mark each load instruction to be stalled. In one embodiment, for example, a stall bit or the like may be provided for each entry in the scheduler 112, in which the stall bit is set to stall the load instruction or cleared to allow the load instruction to be dispatched. When a load instruction is otherwise ready for dispatch, if it is identified as stalled by the load buffer 116, the scheduler 112 stalls dispatch until the stall indication is removed for that load instruction. Thus, the stall bit simply becomes another condition that must be met before the load instruction is ready to be dispatched for execution.

The provision of the load buffer 116 provides several advantages. First, the FUL2 indication is not speculatively determined but provides an actual determination of when the load queue 118 is full. Second, when the load queue 118 is full, the front end 110 is not yet stalled since load instructions may continue to be issued to the scheduler 112 and buffered in the load buffer 116. The issuance of instructions is not stalled and the dispatching of other instruction types (other than loads) may continue. Also, dispatching of the load instructions already in the load queue 118 may continue. Third, the load buffer 116 may store less information per entry as compared to the load queue 118 and may be made significantly deeper. In one embodiment, for example, each entry of the load buffer 116 only needs to store the source and destination identifier of the corresponding load instruction and a store valid vector that includes order information (further described herein for FIG. 2). The load buffer 116 may store additional information, but does not need to store all of the same information that is stored in the load queue 118. In this manner, the load queue 118 does not consume appreciable resources and substantially reduces the likelihood of stalling the front end.

When the load queue 118 becomes full and provides the full indication FUL2, then issued load instructions may continue to be buffered in the load buffer 116. If the load buffer 116 also becomes full so that it cannot accept more load instructions, then the load buffer 116 provides a full indication FUL1 to stall the front end 110. In response to FUL1 provided by the load buffer 116, the front end 110 stalls issuance of all instructions until FUL1 is no longer provided. Although this situation appears similar to a conventional configuration in which the front end is stalled, the processor 100 provides significant advantages. First, the full determination is not speculatively determined. Second, the load buffer 116 allows the scheduler 112 to have a substantially greater number of issued instructions for out-of-order dispatching. Thus, the execution stage 106 can remain busy processing instructions for a greater period of time as compared to the conventional configuration. As load instructions are completed by the load pipe 120, then corresponding entries are freed in the load queue 118 and buffered load instructions in the load buffer 116 may be pushed into the load queue 118 and ultimately dispatched by the scheduler 112.

Figure 2:
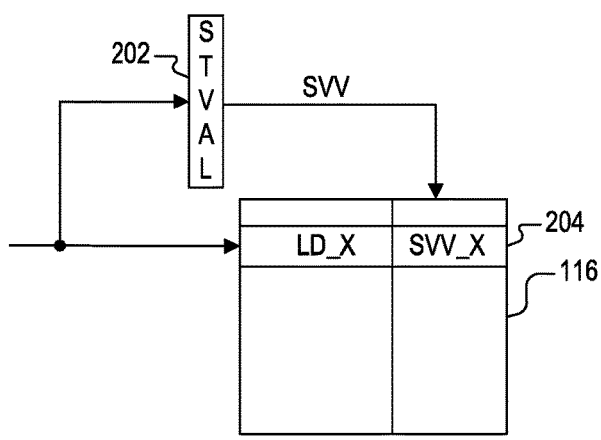
FIG. 2 is a block diagram of the load buffer of FIG. 1 implemented according to one embodiment of the present invention.

FIG. 2 is a block diagram of the load buffer 116 implemented according to one embodiment of the present invention. Although not shown, the processor 100 includes a store queue configured in similar manner as the load queue 118. The store queue holds information needed for execution of dispatched store instructions. Each time a load instruction is issued, it is desired to determine the number of store instructions that have been previously issued before that load instruction. A valid list 202 (STVAL) includes a valid bit for each entry of the store queue. In this manner, when a load instruction is issued, the current state of the valid list 202 identifies the previously issued store instructions. Thus, the current state of the valid list 202 is output as a store valid vector (SVV) that is stored along with the issued load instruction. As shown, for example, when a load instruction, shown as LD_X, is stored into an entry 204 of the load buffer 116, a corresponding SVV, shown as SVV_X, is retrieved from the valid list 202 and stored in the entry 204 of the load buffer 116. SVV_X provides order information of the load instruction LD_X relative to issued store instructions to identify which store instructions are older than the load instruction LD_X.

Figure 3:
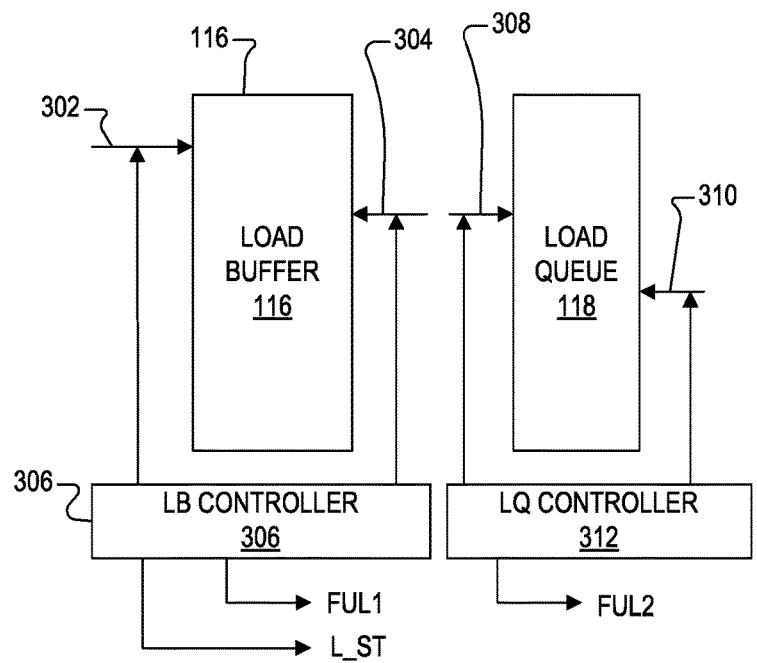
FIG. 3 is a block diagram illustrating control of the load buffer and the load queue of FIG. 1 according to one embodiment of the present invention.

FIG. 3 is a block diagram illustrating control of the load buffer 116 and the load queue 118 according to one embodiment of the present invention. The load buffer 116 includes a push pointer 302 and a pop pointer 304 provided or otherwise controlled by a load buffer (LB) controller 306. The LB controller 306 uses and/or updates the push pointer 302 to load entries into the load buffer 116 from the front end 110 and uses and/or updates the pop pointer 304 when items are popped from the load buffer 116 when pushed into the load queue 118. The LB controller 306 uses the pointer values to determine when the load buffer 116 is full for providing the FUL1 indication. The LB controller 306 also provides and/or updates L_ST for each cycle that FUL2 is provided by the load queue 118 so that only those load instructions that have been loaded into the load queue 118 may be dispatched by the scheduler 112.

The load queue 118 includes a push pointer 308 and a pop pointer 310 provided or otherwise controlled by a load queue (LQ) controller 312. The LQ controller 312 uses and/or updates the push pointer 308 to load entries into the load queue 118 when popped from the load buffer 116, and uses and/or updates the pop pointer 310 to pop entries from the load queue 118 when completed by the load pipe 120. The LQ controller 312 uses the pointer values to determine when the load queue 118 is full for providing the FUL2 indication. As previously noted, the LQ controller 312 may be configured to control L_ST instead of the LB controller 306. In one embodiment, the memory space of the load queue 118 comprises, for example, one memory bank, and the memory space of the load buffer 116 comprises multiple memory banks, each of which is a duplicate of the memory bank of the load queue 118. In such a case, the push pointer 308 of the load queue 118 is equal to the pop pointer 304 of the load buffer 116. When the load buffer 116 is full, the pop pointer 310 of the load queue 118 is also equal to the push pointer 302 of the load buffer 116.

Figure 4:
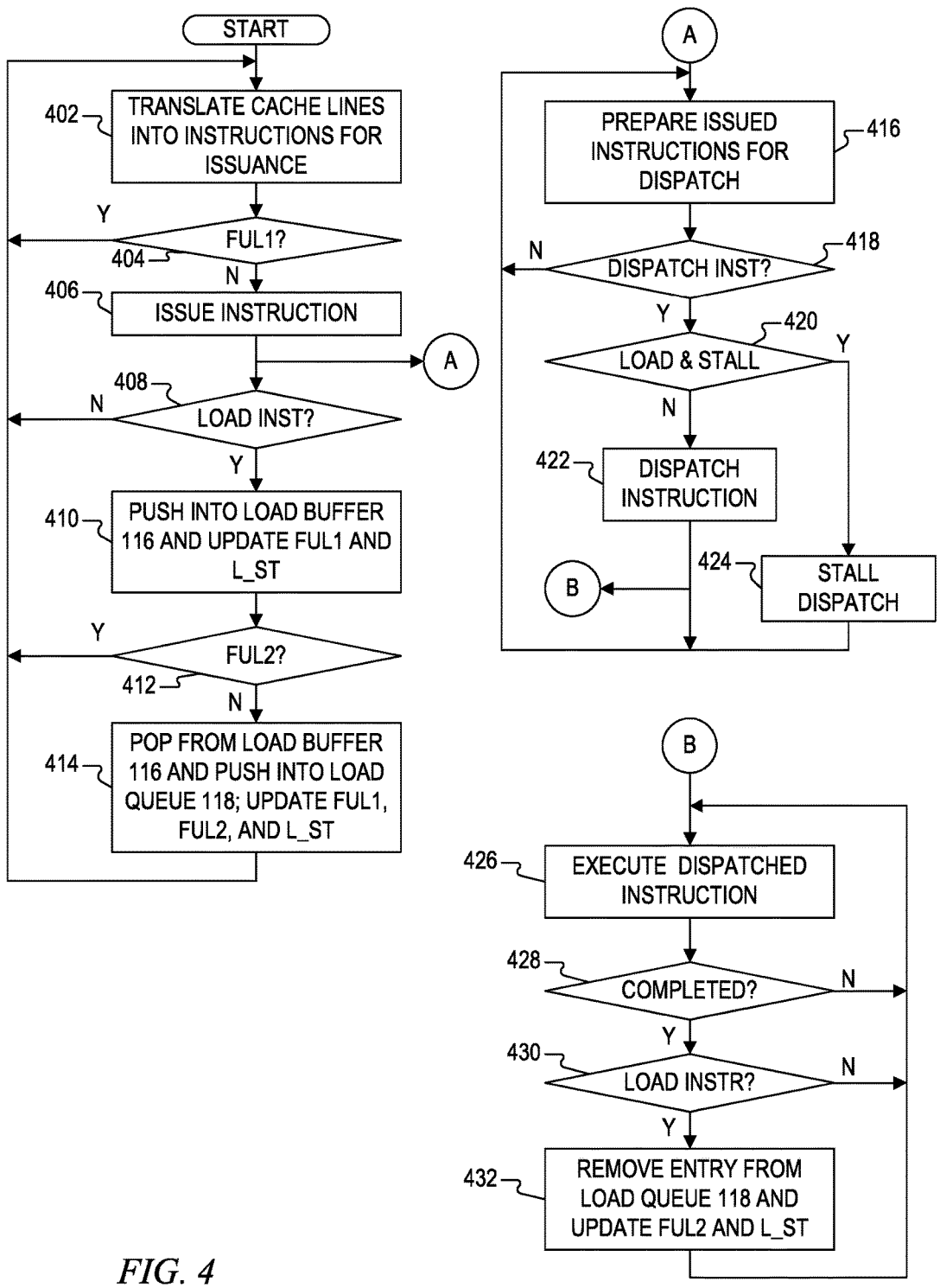
FIG. 4 is a flowchart diagram illustrating operation of the processor of FIG. 1 for issuing, dispatching, and executing instructions including operation of the load buffer and the load queue of FIG. 1 according to one embodiment of the present invention.

FIG. 4 is a flowchart diagram illustrating operation of the processor 100 for issuing, dispatching, and executing instructions including operation of the load buffer 116 and the load queue 118 according to one embodiment of the present invention. The flowchart diagram is illustrated in serial or sequential format as applied to each instruction (e.g., shown in singular). It is understood, however, that one or more of the blocks may be applicable to multiple instructions at a time. For example, most processors, including the processor 100, issue, dispatch and execute multiple instructions at a time. Also, the blocks separated into issuance, dispatch and execution operations, in which it is understood that these different operations are performed in parallel in a pipeline processor configuration.

The first set of blocks 402-414 generally denote issuance operations. At a first block 402, the front end 110 translates instructions from cache lines as previously described. At next block 404, it is queried whether FUL1 is provided indicating that the load buffer 116 is full. If so, operation loops back to block 402 and the front end 110 continues translation processing as long as it can while instructions are not issued to the processor pipeline. If FUL1 indicates that the load buffer 116 is not full as determined at block 404, then operation instead proceeds to block 406 in which an instruction is issued. In many configurations multiple instructions may be issued at a time. At next block 408, it is queried for each instruction whether the instruction is a load instruction. If not, operation loops back to block 402 for continued translation and/or issuance processing.

When it is determined at block 408 that a load instruction has been issued, then at block 410 the load instruction is pushed into the load buffer 116 and FUL1 is updated. It is noted that FUL1 may be checked or updated with each change of the contents of the load buffer 116. During update, FUL1 remains unchanged as long as the load buffer 116 is not full. If, however, the load buffer 116 becomes full when the load instruction is pushed into it, then FUL1 is modified to indicate that the load buffer 116 has become full. The load stall indication L_ST to the scheduler 112 may also be updated at this time since the newly pushed load instruction, along with any other load instructions in the load buffer 116 that have not been transferred to the load queue 118, may not be yet dispatched. Operation then proceeds to block 412 in which it is queried whether FUL2 indicates that the load queue 118 is full. If so, then load instructions in the load buffer 116 may not yet be transferred to the load queue 118, and operation loops back to block 402 to continue translation and/or issue operations. It is noted that in an alternative configuration, L_ST provided to the scheduler 112 may be updated at this point to stall the dispatch of any load instructions that have been issued but have not yet been pushed into the load queue 118. If instead FUL2 is not indicated at block 412, then operation proceeds to block 414 in which at least one load instruction is popped from the load buffer 116 and pushed into the load queue 118. The indications FUL1, FUL2 and L_ST may be updated at this time. It is noted that FUL2 may be checked and/or modified each time that the contents of the load queue 118 is changed. Operation then loops back to block 402 for continued translation/issuance operations.

Blocks 416-424 generally refer to dispatch operations. Referring back to block 406, as instructions are being issued and loaded into the scheduler 112, the scheduler 112 begins preparing each of the issued instructions for dispatch as denoted at block 416. This may simply mean checking and/or updating any parameters necessary to determine whether the instruction is ready to be executed. At next block 418, it is queried whether an instruction is ready to be dispatched for execution. If not, operation loops back to block 416. Otherwise, operation proceeds to block 420 in which it is determined whether the instruction is a load instruction and if so, whether the load instruction has been stalled from being dispatched (such as indicated by the L_ST indication including any bits set in response to the L_ST indication). If not a load instruction, or if the instruction is a load instruction that has not been stalled, then operation proceeds to block 422 in which the instruction is dispatched, and operation returns to block 416. Otherwise, if the instruction is a stalled load instruction, then operation proceeds to block 424 in which dispatch of the load instruction is temporarily stalled, and operation loops back to block 416.

As instructions are dispatched to the execution units, the instructions are executed as denoted at block 426. Blocks 426-432 generally denote execution operations. While the instruction is still executing and not completed as determined at block 428, then operation loops back to block 426 until completed. When execution of an instruction is completed as determined at block 428, operation proceeds to block 430 in which it is queried whether the instruction is a load instruction. If not, operation loops back to block 426. If it is a load instruction that has completed, then operation proceeds instead to block 432 in which the entry for the load instruction is removed (or popped) from the load queue 118, and FUL2 and L_ST are updated. Operation then returns to block 426 for continued execution operations.

As illustrated by block 414, load instructions pushed into the load buffer 116 may be transferred to the load queue 118 when not full. When the load queue 118 is full as determined at block 412, issued load instructions may continue to be loaded into the load buffer 116 as illustrated by block 416. If the load buffer 116 becomes full as indicated at block 404, then issuance operations are temporarily suspended. When the load queue 118 becomes full, L_ST is updated to identify issued load instructions that have not yet been pushed into the load queue 118. During dispatch operations, an instruction ready for dispatch may be dispatched unless it is a load instruction that is indicated as stalled from being dispatched as illustrated by block 422 and 424. When the load queue 118 becomes full and load instructions begin to be buffered in the load buffer 116, then issued load instructions that have not yet been transferred to the load queue 118 are temporarily stalled from being dispatched. Nonetheless, issued load instructions that have been transferred to the load queue 118 may be dispatched.

The foregoing description has been presented to enable one of ordinary skill in the art to make and use the present invention as provided within the context of a particular application and its requirements. Although the present invention has been described in considerable detail with reference to certain preferred versions thereof, other versions and variations are possible and contemplated. Various modifications to the preferred embodiments will be apparent to one skilled in the art, and the general principles defined herein may be applied to other embodiments. For example, the circuits described herein may be implemented in any suitable manner including logic devices or circuitry or the like.

Those skilled in the art should appreciate that they can readily use the disclosed conception and specific embodiments as a basis for designing or modifying other structures for carrying out the same purposes of the present invention without departing from the spirit and scope of the invention. Therefore, the present invention is not intended to be limited to the particular embodiments shown and described herein, but is to be accorded the widest scope consistent with the principles and novel features herein disclosed.

What is claimed is:

1. A processor that is capable of reducing processor pipeline stall, comprising:
    a front end that issues instructions while a first full indication is not provided, and that stalls issuing instructions when said first full indication is provided;
    a load queue that stores a plurality of load instruction entries in which each entry stores an issued load instruction and corresponding information needed to execute said issued load instruction, wherein said load queue provides a second full indication when said load queue is full;
    a scheduler that stores instructions that have been issued from said front end and that dispatches issued instructions to be executed, wherein said scheduler stalls dispatch of issued load instructions that have not yet been stored into said load queue when said load queue is full; and
    a load buffer that receives and transfers load instructions that have been issued from said front end to said load queue while said second full indication is not provided, that buffers said load instructions that have been issued from said front end while said second full indication is provided, and that provides said first full indication when said load buffer is full;
    wherein a stall indication is provided, by the load queue or the load buffer, to said scheduler to stall dispatch of said issued load instructions that have not yet been stored into said load queue when said load queue is full.

2. The processor of claim 1, wherein said stall indication identifies load instructions that are stored in said load buffer and that have not been transferred to said load queue.

3. The processor of claim 1, wherein said stall indication identifies load instructions that are stored in said load queue.

4. The processor of claim 1, wherein:
said load buffer comprises a plurality of entries in which each entry includes a source identifier and a destination identifier; and
wherein said load queue comprises a plurality of entries in which each entry includes said source identifier, said destination identifier, a memory address, and memory space for storing data.

5. The processor of claim 1, wherein said load buffer stores information identifying previously issued store instructions with each buffered load instruction.

6. The processor of claim 5, further comprising:
a valid list comprising a plurality of valid bits including a valid bit for each entry of a store queue; and
wherein said load buffer comprises a plurality of entries in which each entry includes a field for storing a valid vector comprising said plurality of valid bits of said valid list at a time when said each buffered load instruction is pushed into said load buffer.

7. The processor of claim 1, wherein said scheduler continues to dispatch load instructions that are stored in said load queue while said second full indication is provided.

8. The processor of claim 1, wherein said scheduler continues to dispatch issued instructions other than issued load instructions that are stalled while said second full indication is provided.

9. The processor of claim 1, wherein said load queue comprises a memory bank, and said load buffer comprises multiple memory banks, each of which is a duplicate of the memory bank of the load queue.

10. A method capable of reducing processor pipeline stall, comprising:
issuing instructions, by a front end, while a first full indication is not provided, and stalling said issuing instructions while the first full indication is provided;
storing, by a load queue, a plurality of issued load instructions and corresponding information needed to execute each of the plurality of issued load instructions, and providing, by the load queue, a second full indication when the load queue is full;
dispatching, by a scheduler that stores the issued instructions, those of the issued instructions that are ready to be executed, and stalling dispatching of issued load instructions that have not yet been stored into the load queue when said load queue is full;
receiving and forwarding, by a load buffer, load instructions issued from the front end to the load queue while the second full indication is not provided, and buffering, by the load buffer, said load instructions while the second full indication is provided; and
providing, by the load buffer, the first full indication when the load buffer is full,
wherein said stalling dispatching comprises providing a stall indication, by the load queue or the load buffer, to said scheduler to stall dispatching of said issued load instructions that have not yet been stored into said load queue when said load queue is full.

11. The method of claim 10, wherein said stalling dispatching comprises:
detecting that the load queue is full and providing the second full indication; and
receiving the second full indication and providing the stall indication.

12. The method of claim 11, wherein said providing said stall indication comprises marking instructions in the scheduler that are also located in the load buffer.

13. The method of claim 10, wherein said providing said stall indication comprises marking instructions in the scheduler that are also located in the load queue.

14. The method of claim 10, further comprising:
upon issuing each load instruction of the load instructions, identifying older store instructions; and
storing into the load buffer, along with each load instruction of the load instructions, information that identifies the older store instructions that are older than the respective load instruction.

15. The method of claim 14, wherein said identifying older store instructions comprises maintaining a valid list of a plurality of valid bits identifying valid store instructions, and wherein said storing into the load buffer comprises storing a valid vector comprising the plurality of valid bits of the valid list along with each load instruction of the load instructions when stored into the load buffer.

16. The method of claim 10, further comprising continuing to dispatch load instructions that are located in the load queue while the second full indication is provided.

17. The method of claim 10, further comprising continuing to dispatch issued instructions other than issued load instructions that are stalled while the second full indication is provided.

18. The method of claim 10, further comprising providing a memory bank for the load queue, and providing multiple memory banks for the load buffer in which each memory bank of the load buffer is a duplicate of the memory bank for the load queue.

* * * * *